United States Patent [19]

Cekada, Jr.

[11] 3,713,851
[45] Jan. 30, 1973

[54] AQUEOUS SILOXANE BAG LUBRICANT FOR TIRE MOLDING

[76] Inventor: Joseph Cekada, Jr., 1827 Eastlawn, Midland, Mich. 48640

[22] Filed: Jan. 5, 1972

[21] Appl. No.: 215,642

Related U.S. Application Data

[63] Continuation-in-part of Ser. No. 148,899, June 1, 1971, which is a continuation-in-part of Ser. No. 40,452, May 25, 1970, abandoned.

[52] U.S. Cl............106/38.22, 106/287 SB, 117/5.1, 117/139, 252/28, 260/29.2 M, 260/37 SB, 264/338
[51] Int. Cl. ...............................................B28b 7/36
[58] Field of Search......106/38.22, 38.27, 2, 13, 287; 117/5.1, 5.3, 139; 252/28; 260/29.2 M, 37 SB; 264/338

[56] References Cited

UNITED STATES PATENTS

| | | | |
|---|---|---|---|
| 2,811,408 | 10/1957 | Braley | 117/5.1 |
| 3,406,236 | 10/1968 | Kniege | 106/38.22 |
| 3,532,624 | 10/1970 | Cekada | 252/28 |

*Primary Examiner*—Lorenzo B. Hayes
*Attorney*—Robert F. Fleming, Jr.

[57] ABSTRACT

A composition useful as a bag lubricant in tire manufacturing is disclosed which composition consists essentially of (A) 1 to 20 percent by weight of an alkylmethyl-siloxane fluid having from one to 20 carbon atoms in the alkyl group and at least 1000 cs. viscosity at 25° C., (B) 2 to 20 percent by weight of a material selected from the group consisting of (1) polyalkylene glycols having a molecular weight of at least 500 in which the alkylene oxide units are ethylene oxide units, propylene oxide units or combinations of ethylene oxide and propylene oxide units and (2) copolymers of alkylmethylsiloxanes and polyalkylene glycols in which the alkylene oxide units are ethylene oxide units, propylene oxide units or combinations of ethylene oxide and propylene oxide units, said copolymers having a viscosity of at least 200 cs. at 25°C. and containing from 5 to 50 percent by weight of the alkylmethylsiloxanes, (C) 25 to 50 percent by weight of mica of 75 to 600 mesh, (D) 0.1 to 5 percent by weight of a material selected from the group consisting of (1) finely divided magnesium silicate, (2) carboxymethyl cellulose and (3) carboxyethyl cellulose, (E) 0.1 to 5 percent by weight of lecithin, and (F) 15 to 55 percent by weight of water. Alternative formulation is a copolymer of an alkylmethyl siloxane and a polyalkylene glycol in lieu of components (A) and (B) in the preceding composition.

10 Claims, No Drawings

AQUEOUS SILOXANE BAG LUBRICANT FOR TIRE MOLDING

This application is a continuation-in-part of application, Ser. No. 148,899 filed June 1, 1971, which application was a continuation-in-part of application, Ser. No. 40,452 filed May 25, 1970, now abandoned.

The use of methylpolysiloxanes as release agents for tires and other plastic articles is well known. In the manufacture of tires, the methylpolysiloxane fluid is sprayed on the mold for the release of the tire from the metal surface. In such applications dimethylpolysiloxane alone is an excellent release agent.

However, in the manufacture of the tire the actual shaping of the tire is caused by inflating a rubber bag inside the green tire carcass which forces the tire into shape within the mold. Subsequently, the bag must release cleanly from the inside of the vulcanized tire without forming defects. The material used as a parting agent between the tire carcass and the bag is commonly called a bag or band-ply lubricant. This invention is particularly designed to enhance the effectiveness of these lubricants.

In applicant's U.S. Pat. No. 3,532,624 there is disclosed and claimed a band-ply lubricant based on a solvent system. This composition has obtained a wide commercial success in the tire industry. However, with the growing menace of air pollution it is often undesirable to employ hydrocarbon solvents on a large scale. There is need for an aqueous system which will accomplish results equivalent to those of the composition in the aforesaid application. This invention offers such a composition.

It is the object of the present invention to provide a band-ply lubricant which will improve bag life, give fewer tire rejects at lower overall costs to the manufacturer, which composition can be stored for long periods of time without settling and which will avoid the necessity of using organic solvents.

This invention relates to a composition consisting of (A) 1 to 20 percent by weight of an alkylmethylsiloxane fluid having from one to 20 carbon atoms in the alkyl group and at least 1,000 cs. viscosity at 25° C., (B) 2 to 20 percent by weight of a material selected from the group consisting of (1) polyalkylene glycols having a molecular weight of at least 500 in which the alkylene oxide units are ethylene oxide units, propylene oxide units or combinations of ethylene oxide and propylene oxide units and (2) copolymers of alkylmethylsiloxanes and polyalkylene glycols in which the alkylene oxide units are ethylene oxide units, propylene oxide units or combinations of ethylene oxide and propylene oxide units, said copolymers having a viscosity of at least 200 cs. at 25° C. and containing from 5 to 50 percent by weight of the alkylmethylsiloxane, (C) 25 to 50 percent by weight of mica of 75 to 600 mesh, (D) 0.1 to 5 percent by weight of a material selected from the group consisting of (1) finely divided magnesium silicate, (2) carboxymethyl cellulose, and (3) carboxyethyl cellulose, (E) 0.1 to 5 percent by weight of lecithin, and (F) 15 to 55 percent by weight of water.

If desired, (B)(2) can be a mixture of an alkylene oxide and a copolymer of an alkylmethylsiloxane and alkylene oxide.

This invention also relates to a composition which consists essentially of (I) 3 to 40 percent by weight of a copolymer of an alkylmethylsiloxane having from one to 20 carbon atoms in the alkyl group, and a polyalkylene glycol in which the alkylene oxide units are ethylene oxide units, propylene oxide units or combinations of ethylene oxide and propylene oxide units, said copolymer having a viscosity of at least 200 cs. at 25° C. and containing from 5 to 50 percent by weight of the alkylmethylsiloxane, (II) 25 to 50 percent by weight of mica of 75 to 600 mesh, (III) 0.1 to 5 percent by weight of a material selected from the group consisting of (1) finely divided magnesium silicate, (2) carboxymethyl cellulose, and (3) carboxyethyl cellulose, (IV) 0.1 to 5 percent by weight of lecithin, and (V) 15 to 55 percent by weight of water.

The siloxanes employed herein are alkylmethyl-siloxanes which are fluid in nature and they must have a viscosity of at least 1000 cs. at 25° C. The upper limit of the viscosity is not critical so that it can range upwards of 10,000,000 cs. at 25° C. That is siloxane (A) could be a non-flowing gum. The alkylmethylsiloxane can be a dimethylsiloxane, which is preferred, or a siloxane of the unit formula $RCH_3SiO$ in which R is an alkyl group of from two to 20 carbon atoms such as an ethyl, isopropyl, butyl, octyl, dodecyl or $C_{20}H_{41}$ group. These alkylmethylsiloxanes can be hydroxyl endblocked or they can be endblocked with trihydrocarbon silyl groups. Also the alkylmethylsiloxane fluids can contain minor amounts of $RSiO_{3/2}$ and $SiO_{4/2}$ units. These types of fluids are well known in the art and no method for their preparation need be elucidated here.

Component (B) can be a polyalkylene glycol having a molecular weight of at least 500. It can be, for example, polyethylene glycol, or polypropylene glycol, or copolymers thereof. It is a combination of (A) and (B) which gives the proper lubricity to the bag. The initiator employed in the manufacture of the polyalkylene glycol is not critical and if desired, the polyalkylene glycol can be endblocked with well known monovalent groups.

Component (B) can also be a copolymer of an alkylmethylsiloxane and a polyalkylene glycol in which the alkylene oxide units are ethylene or propylene oxide or combinations of the two. These copolymers are well known materials of commerce and examples of the structure which are operative herein can be found in numerous patents including U.S. Pat. Nos. 3,402,192, 2,846,458 and 3,057,901; Canadian Pat. 669,881; Belgian Pats. 739,312 and 730,686; and French Pats. 1,259,241 and 1,353,070, all of which are hereby incorporated in this application by reference. In these copolymers the alkylene oxide moiety can have hydroxyl ends or can be endblocked with monovalent organic groups such as hydrocarbon, halohydrocarbon, carboxyl, $SiR_3$, urethane or acyl groups. The polyalkylene oxide moiety is attached to the siloxane moiety by a silicone-carbon bond, but the linking group between the polyalkylene oxide and the siloxane moieties can be, for example, hydrocarbon or halohydrocarbon, or can contain ether, ester, sulfide or other linkages. These copolymers can be linear, branched or cyclic in structure and they can have one or more alkylene oxide moiety attached to any one silicon atom.

The siloxane portion of the copolymer can contain $RSiO_{3/2}$, $R_2SiO$, $R_3SiO_{1/2}$ or $SiO_2$ units in any combination thereof.

The generic formula for such copolymers is $$(R_nSiO_{\frac{4-n}{2}})_b(R'_mSiB_yO_{\frac{4-m-y}{2}})_c$$

in which R and R' are alkyl radicals of 1 to 20 carbon atoms, n is 0 to 3, m is 0 to 2, y is 1 to 2, b is 0 or an integer, c is an integer of at least 1, and B is the group — $R^2(OR^3)_dOR^4$ in which $R^2$ is the linking group as above defined, $R^3$ is —$CH_2CH_2$— or $$-CH_2\overset{CH_3}{\underset{|}{C}H}-$$

and $R^4$ is a monovalent end group of any type such as shown above and d is such that the molecular weight of $OR^3$ groups total at least 1,000.

Ingredient (I) employed in this invention has the generic formula shown in the preceding paragraph and can have, for example, any of the structures shown in any of the patents incorporated herein by reference, (I) has certain critical limitations not applicable to (B)(2). The viscosity of (I) must be at least 200 cs. at 25° C. and the percent by weight of the siloxane must be in the range of from 5 to 50 percent of the total weight of (I).

The finely divided magnesium silicate used herein is a standard article of commerce. Any such material which causes thixotropy in water (i.e. the water is thickened under zero shear but becomes fluid under shear) are operative herein. The magnesium silicate is sold in various forms and the term includes those magnesium silicates derived from clays such as, for example, the saponites. The best types for use herein are magnesium silicates which have tube and rod-like crystal structures which expand in the presence of water and which will contract when the water is removed. The term includes magnesium silicates containing aluminum in which the magnesium is in greater proportion than the aluminum. If desired, the magnesium silicate can be treated with various well known organic materials to increase the hydrophilic nature of the silicate.

In lieu of the magnesium silicate there can be used carboxymethyl cellulose or carboxyethyl cellulose as the thickening agent. These materials are well known and commercially available. The use of carboxymethyl cellulose is believed to result in a more stable composition and makes formulation of the composition easier.

The lecithin used herein is a naturally occurring material and can be derived from any source. One convenient source is from soya beans.

The compositions of this invention can be put together by mixing the ingredients in any desired combination. One way of preparing it is to place the magnesium silicate in water, then mix in all of the ingredients except mica on an efficient mixer such as a Cowles mixer, and then add the mica with vigorous agitation. If desired, the entire combination can be put through a colloid mill in order to obtain better dispersion. Also, it is believed that the composition is best prepared by emulsifying the alkylmethyl-siloxane fluid prior to admixing the other components therewith.

The compositions of this invention are characterized by great stability and they can be shipped and/or stored for long periods of time without settling and then be sprayed on the commercial apparatus employed in rubber plants and still give excellent release of the bag from the tire. This combination of properties means that the tire manufacturers can buy a product ready-made which operates successfully in their plants without the necessity of having to formulate bag lubricants.

In addition to the above required ingredients the compositions of this invention can contain minor amounts of other fillers such as talc; rust inhibitors such as sodium nitrate; germicides such as formaldehyde and other ingredients such as coloring agents and antifreeze materials.

The following ingredients used in the examples below are hereby defined.

VEEGUM (manufactured by R.T. Vanderbilt Company) is a magnesium silicate derived from saponite. It is an inorganic colloidal magnesium aluminum silicate of the composition

| | |
|---|---|
| silicon dioxide | 61.1% |
| magnesium oxide | 13.7% |
| aluminum oxide | 9.3% |
| titanium dioxide | 0.1% |
| ferric oxide | 0.9% |
| calcium oxide | 2.7% |
| sodium oxide | 2.9% |
| potassium oxide | 0.3% |
| carbon dioxide | 1.8% and |
| water of combination | 7.2% |

BENTONE LT is a product of National Lead Company and it is a magnesium silicate free of aluminum having a specific gravity of 1.9 and weighing 16.5 pounds per gallon.

Dowicil 100 is a hexamethylenetetraamine-1-3-dichloropropane adduct shown in U.S. Pat. No. 3,228,829. It is a germicide.

The following examples are illustrative only and should not be construed as limiting the invention. In the examples Me is an abbreviation for the methyl radical. All parts and percents referred to herein are by weight and all viscosities measured at 25° C. unless otherwise specified.

EXAMPLE 1

This example shows the stability of the compositions to settling.

0.4 pounds of VEEGUM was dispersed in 7.6 pounds of water and then mixed with 5.72 pounds of a 35 percent aqueous emulsion of a 100,000 cs. dimethylpolysiloxane fluid, 5.6 pounds of a silicone-polyalkylene oxide copolymer of the average formula $$Me_3SiO(Me_2SiO)_{76}\{MeSiO\}_7SiMe_3$$
$$\underset{(CH_2)_3O(C_2H_4)_{24}(C_3H_6O)_{24}\overset{O}{\underset{\|}{C}}-Me}{|}$$

and having a viscosity of 1200 cs. at 25° C., 0.8 pounds of soya lecithin and 4.68 pounds of additional water. The mixing was carried out on a Cowles dissolver and 15.2 pounds of mica (325 mesh) was blended in the total composition and was passed through a colloid mill set at 30 mils.

The stability of the composition was checked for compaction of the mica by centrifuging 5 minutes at 2000 r.p.m. The mica had not settled out. The composition was then placed on a truck which was then driven 500 miles. The stability was excellent. The formulation in percent by weight was

- 5% dimethylpolysiloxane 100,000 cs.
- 14% silicone-polyalkylene oxide copolymer
- 1% VEEGUM
- 2% lecithin
- 38% mica
- 40% water.

EXAMPLE 2

Using the procedure of Example 1, the following composition was prepared in percent by weight.

- 5.0% of a polydimethylsiloxane of 100,000 cs. viscosity
- 12.0% of the silicone-polyalkylene oxide copolymer of Example 1
- 41.0% of 325 mesh mica
- 1.0% soya lecithin
- 0.5% VEEGUM
- 40.5% water.

The composition showed excellent stability while being sprayed through a conventional band-ply lubricant system in a tire factory. It gave excellent release of the tires from the bag.

EXAMPLE 3

Using the procedure of Example 1 the following formulation was made in percent by weight.

- 5.0% of the siloxane of Example 1

12.0% of 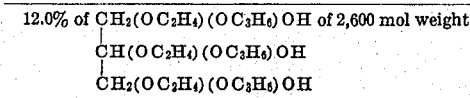

- 1.0% soya lecithin
- 0.5% VEEGUM
- 41.0% mica 325 mesh
- 0.3% of 30% formaldehyde solution
- 40.2% water.

This formulation showed excellent stability after three months storage.

EXAMPLE 4

The following formulation was prepared in percent by weight using the method of Example 1.

- 5.0% of the siloxane of Example 1
- 12.0% of the polyalkylene glycol of Example 3
- 41.0% mica (325 mesh)
- 1.0% soya lecithin
- 1.0% VEEGUM
- 0.1% Dowicil 100
- 39.92 water This formulation showed excellent stability and was sprayed on the bags for molding tires in a tire factory. Excellent release was obtained and the tires were without defect.

EXAMPLE 5

Good stability was obtained with the following formulation.

- 5.0% of the siloxane of Example 1
- 0.7% BENTONE LT
- 12.0% of the polyalkylene glycol of Example 3
- 1.0% soya lecithin
- 41.0% mica (325 mesh)
- 40.3% water The ingredients were mixed on a Cowles mixer.

EXAMPLE 6

This example shows the operativeness of a high viscosity siloxane-polyalkylene oxide copolymer in place of the mixture of siloxane and polyalkylene oxides of Examples 1 to 5.

Good stability was obtained from the following formulation in percent by weight. 23 percent of a 13,571 cs. viscosity copolymer of the formula

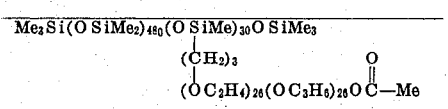

- 41% mica (325 mesh)
- 1% soya lecithin
- 1% VEEGUM
- 34% water.

This formulation gave good lubricity to the rubber bags used in tire molding.

EXAMPLE 7

Equivalent results are obtained when the following alkylmethylsiloxanes are used in place of the dimethylsiloxane in the preceding examples.

| | |
|---|---|
| dimethylpolysiloxane | 1,000 cs. |
| ethylmethylpolysiloxane | 10,000 cs. |
| isopropylmethylsiloxane | 20,000 cs. |
| octylmethylsiloxane | 30,000 cs. |
| decylmethylsiloxane | 30,000 cs. |
| dodecylmethylsiloxane copolymer of 50 mol percent dimethylsiloxane 50 mol percent ethylmethylsiloxane | 40,000 cs. 1,000,000 cs. |

EXAMPLE 8

Equivalent results are obtained when the following siloxane-alkylene oxide copolymers are used in place of the siloxane-alkylene oxide copolymers of the preceding examples.

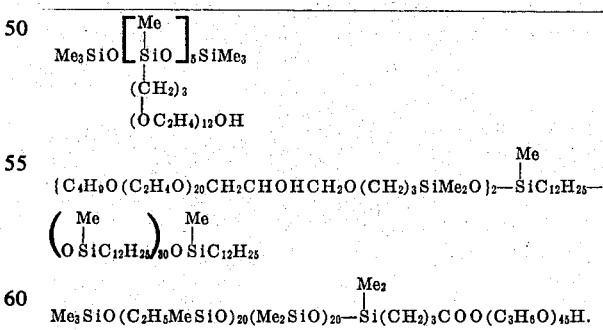

EXAMPLE 9

A band-ply lubricant composition was prepared which consisted essentially of 14.3 percent of the dimethylpolysiloxane emulsion of Example 1, 12.0 percent of the polyalkylene glycol of Example 3, 41.0 percent of mica (325 mesh), 0.3 percent of carboxymethyl cellulose, 1.0 percent of soya lecithin, 0.1 percent of Dowicil 100, and 31.3 percent of water. This composition was prepared by first mixing the glycol and carboxymethyl cellulose. Then the water, dimethylpolysiloxane emulsion, lecithin, Dowicil and mica were added and mixed in, in the order just stated. After all the ingredients had been mixed thoroughly, the composition was given one pass through a colloid mill at a 0.025 inch setting. This composition was easy to formulate, exhibited excellent stability, and gave excellent release when used as a band-ply lubricant. The composition had an initial viscosity of 52,000 cs. Two days after preparation it had a viscosity of 44,000 cs., three days after, it had a viscosity of 36,000 cs. and 18 days after it had a viscosity of 35,000 cs. The composition was centrifuged for 40 minutes at 2000 r.p.m.'s and no compaction of the mica was observed.

EXAMPLE 10

When carboxymethyl cellulose is substituted for the magnesium silicate (VEEGUM) in the composition of Example 6, substantially identical results are obtained.

EXAMPLE 11

When carboxyethyl cellulose is substituted for the carboxymethyl cellulose of Example 9, substantially identical results are obtained.

That which is claimed is:

1. A composition consisting essentially of
   A. 1 to 20 percent by weight of an alkylmethylsiloxane fluid having from one to 20 carbon atoms in the alkyl group and at least 1,000 cs. viscosity at 25°C.,
   B. 2 to 20 percent by weight of a material selected from the group consisting of (1) polyalkylene glycols having a molecular weight of at least 500 in which the alkylene oxide units are ethylene oxide units, propylene oxide units or combinations of ethylene oxide and propylene oxide units and (2) copolymers of alkylmethyl-siloxanes having from one to 20 carbon atoms in the alkyl groups and polyalkylene glycols in which the alkylene oxide units are ethylene oxide units, propylene oxide units or combinations of ethylene oxide and propylene oxide units, said copolymers having a viscosity of at least 200 cs. at 25°C. and containing from 5 to 50 percent by weight of the alkylmethyl-siloxane,
   C. 25 to 50 percent by weight of mica of 75 to 600 mesh,
   D. 0.1 to 5 percent by weight of a material selected from the group consisting of (1) finely divided magnesium silicate, (2) carboxymethyl cellulose, and (3) carboxyethyl cellulose,
   E. 0.1 to 5 percent by weight of lecithin, and
   F. 15 to 55 percent by weight of water.

2. A composition as defined in claim 1 wherein (A) is a dimethylsiloxane, and (B) is a polyalkylene glycol.

3. A composition as defined in claim 2 which consists essentially of (A) about 5 percent of a dimethylsiloxane having a viscosity of about 100,000 cs., (B) about 12 percent of a polyalkylene glycol in which the alkylene oxide units are a combination of ethylene oxide and propylene oxide units, (C) about 41 percent of mica of about 325 mesh, (D) about 0.5 percent of magnesium silicate, (E) about 1 percent of soya lecithin, and (F) about 40.5 percent of water.

4. A composition as defined in claim 2 which consists essentially of (A) about 5 percent of a dimethylsiloxane having a viscosity of about 100,000 cs., (B) about 12 percent of a polyalkylene glycol in which the alkylene oxide units are a combination of ethylene oxide and propylene oxide units, (C) about 41 percent of mica of about 325 mesh, (D) about 0.3 percent of carboxymethyl cellulose, (E) about 1 percent of soya lecithin, and (F) about 40.7 percent of water.

5. A composition as defined in claim 1 wherein (A) is a dimethylsiloxane and (B) is a copolymer of a dimethylsiloxane and a polyalkylene glycol.

6. A composition as defined in claim 5 which consists essentially of (A) about 5 percent of a dimethylsiloxane having a viscosity of about 100,000 cs., (B) about 12 percent of a copolymer of the average formula

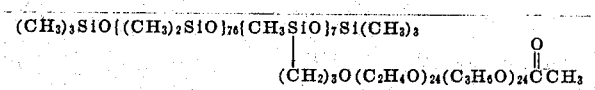

C. about 41 percent of mica of about 325 mesh, (D) about 0.5 percent of magnesium silicate, (E) about 1 percent of soya lecithin, and (F) about 40.5 percent of water.

7. A composition as defined in claim 5 which consists essentially of (A) about 5 percent of a dimethylsiloxane having a viscosity of about 100,000 cs., (B) about 12 percent of a copolymer of the average formula

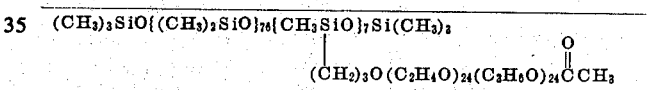

(C) about 41 percent of mica of about 325 mesh, (D) about 0.3 percent of carboxymethylcellulose, (E) about 1 percent of soya lecithin, and (F) about 40.7 percent water.

8. A composition consisting essentially of
   I. 3 to 40 percent by weight of a copolymer of an alkylmethyl-siloxane having from one to 20 carbon atoms in the alkyl group, and a polyalkylene glycol in which the alkylene oxide units are ethylene oxide units, propylene oxide units or combinations of ethylene oxide and propylene oxide units, said copolymer having a viscosity of at least 200 cs. at 25° C. and containing from 5 to 50 percent by weight of the alkylmethylsiloxane,
   II. 25 to 50 percent by weight of mica of 75 to 600 mesh,
   III. 0.1 to 5 percent by weight of a material selected from the group consisting of (1) finely divided magnesium silicate, (2) carboxymethyl cellulose, and (3) carboxyethyl cellulose,
   IV. 0.1 to 5 percent by weight of lecithin, and
   V. 15 to 55 percent by weight of water.

9. A composition as defined in claim 8 which consists essentially of (I) about 23 percent of a copolymer of the average formula

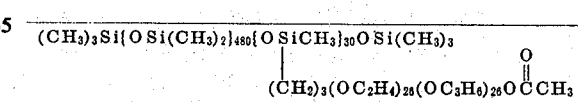

II. about 41 percent of mica of about 325 mesh,
III. about 1 percent of magnesium silicate,
IV. about 1 percent of soya lecithin, and
V. about 34 percent of water.

10. A composition as defined in claim 8 which consists essentially of (I) about 23 percent of a copolymer of the average formula $$(CH_3)_3Si[OSi(CH_3)_2]_{180}[OSiCH_3]_{30}OSi(CH_3)_3$$
$$|$$
$$(CH_2)_3(OC_2H_4)_{26}(OC_3H_6)_{26}O\overset{O}{\underset{\|}{C}}CH_3,$$

II. about 41 percent of mica of about 325 mesh,
III. about 1 percent of carboxymethyl cellulose,
IV. about 1 percent of soya lecithin, and
V. about 34 percent of water.

* * * * *